United States Patent
Toyama

(10) Patent No.: US 9,390,837 B2
(45) Date of Patent: Jul. 12, 2016

(54) WIRE HARNESS

(71) Applicant: Yazaki Corporation, Tokyo (JP)

(72) Inventor: Eiichi Toyama, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 192 days.

(21) Appl. No.: 14/108,676

(22) Filed: Dec. 17, 2013

(65) Prior Publication Data

US 2014/0102782 A1 Apr. 17, 2014

Related U.S. Application Data

(63) Continuation of application No. PCT/JP2012/069514, filed on Jul. 31, 2012.

(30) Foreign Application Priority Data

Aug. 1, 2011 (JP) .................... 2011-167927

(51) Int. Cl.
| | | |
|---|---|---|
| *H01B 7/00* | (2006.01) | |
| *H01B 9/02* | (2006.01) | |
| *B60R 16/02* | (2006.01) | |
| *H01B 9/00* | (2006.01) | |

(52) U.S. Cl.
CPC .............. *H01B 9/02* (2013.01); *B60R 16/0207* (2013.01); *H01B 7/0045* (2013.01); *H01B 9/006* (2013.01)

(58) Field of Classification Search
CPC .......... H01B 7/0045; H01B 7/40; H01B 9/02; H01B 9/006; H01B 13/01263; H01R 9/032; H01R 43/00; H05K 9/0018; H02G 3/0666; H02G 3/22; B60R 16/0207; B60R 16/02; B60R 16/0215; F16M 2200/044; F16M 11/40; F16L 11/14; F16L 11/15; F21V 21/32; Y10T 29/49117

USPC ................ 174/72 A, 360, 135; 138/123, 134; 361/818; 29/825; 464/174
See application file for complete search history.

(56) References Cited

U.S. PATENT DOCUMENTS

| 1,941,151 A | * | 12/1933 | Nigro | ............................. | 138/134 |
| 3,177,901 A | * | 4/1965 | Pierce | ........................ | F16C 1/26 |
| | | | | | 138/130 |

(Continued)

FOREIGN PATENT DOCUMENTS

| EP | 0774816 A2 | 5/1997 |
| JP | 57-138712 A | 8/1982 |

(Continued)

OTHER PUBLICATIONS

Supplementary European Search Report dated Feb. 13, 2015 issued by European Patent Office in counterpart European Application No. 12819870.2.

(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

A wire harness includes one or a plurality of high voltage conduction paths, each having a high voltage conduction path main body, and a terminal which is provided at an end of the high voltage conduction path main body. The high voltage conduction path main body is formed into a cylindrical shape by spirally winding a metal wire rod and an insulating wire rod, and side end surfaces, which face each other, of the metal wire rod and the insulating wire rod positioned to be adjacent to each other alternately, contact each other.

7 Claims, 3 Drawing Sheets

(56) References Cited

U.S. PATENT DOCUMENTS

| | | | |
|---|---|---|---|
| 4,417,093 A | 11/1983 | Occhini et al. | |
| 6,376,775 B1 * | 4/2002 | Leijon | H01F 3/10 174/128.1 |
| 2003/0062177 A1 * | 4/2003 | Yagi | H01R 9/032 174/359 |
| 2009/0099436 A1 * | 4/2009 | Brister | A61B 5/14865 600/347 |
| 2010/0121421 A1 * | 5/2010 | Duncan | A61N 1/05 607/116 |

FOREIGN PATENT DOCUMENTS

| | | |
|---|---|---|
| JP | 10-223054 A | 8/1998 |
| JP | 2001-357732 A | 12/2001 |
| JP | 2009-289640 A | 12/2009 |
| JP | 2011-061610 A | 3/2011 |
| WO | 2007010988 A1 | 1/2007 |
| WO | WO 2012091171 A1 * | 7/2012 |

OTHER PUBLICATIONS

Search Report, dated Sep. 11, 2012, issued by the International Searching Authority, in counterpart Application No. PCT/JP2012/069514.

Written Opinion, dated Sep. 11, 2012, issued by the International Searching Authority, in counterpart Application No. PCT/JP2012/069514.

International Preliminary Report on Patentability dated Feb. 4, 2014 from the International Searching Authority in counterpart Application No. PCT/JP2012/069514.

* cited by examiner

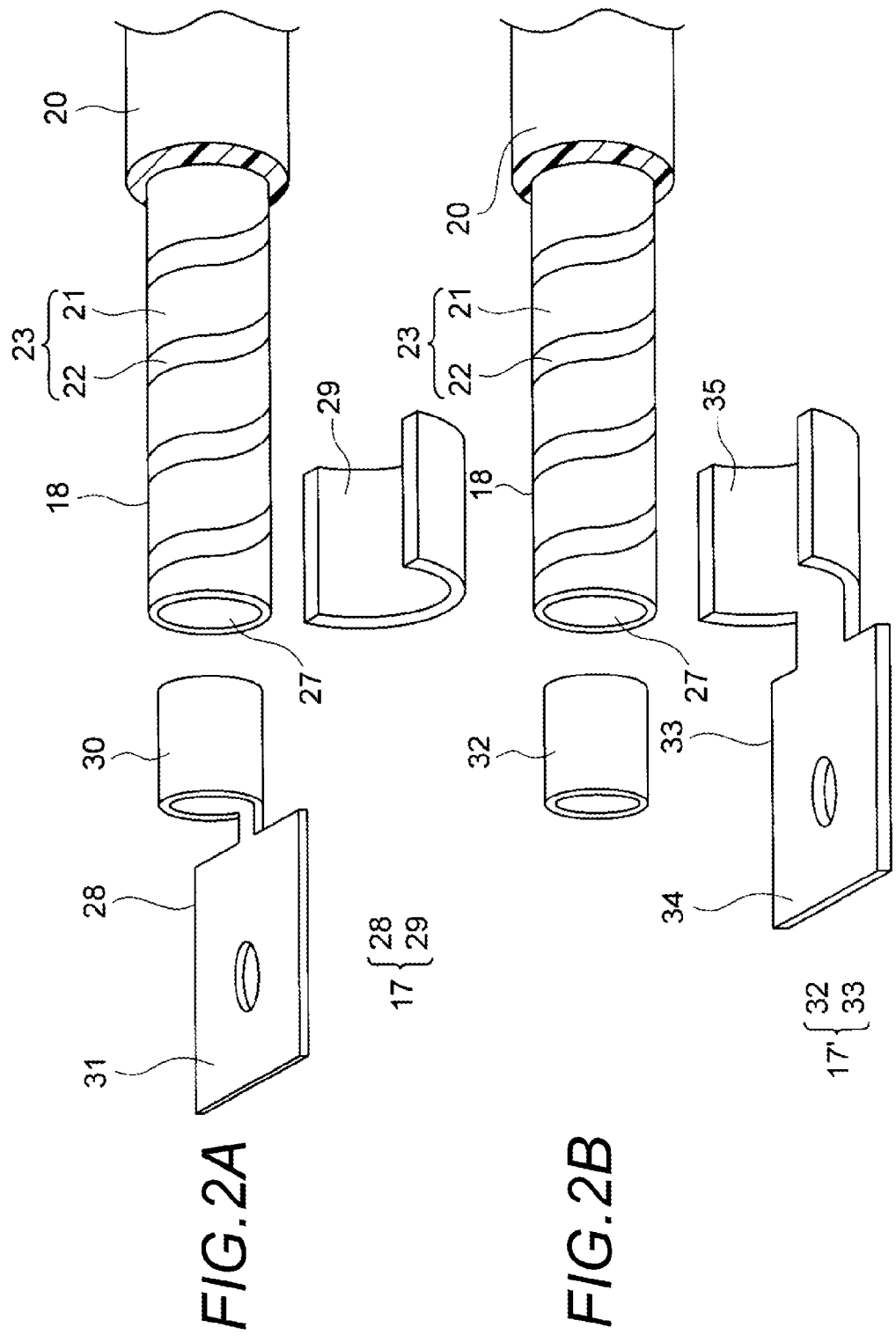

WIRE HARNESS

CROSS REFERENCE TO RELATED APPLICATION

This application is a continuation of PCT application No. PCT/JP2012/069514, which was filed on Jul. 31, 2012 based on Japanese Patent Application (No. 2011-167927) filed on Aug. 1, 2011, the contents of which are incorporated herein by reference. Also, all the references cited herein are incorporated as a whole.

BACKGROUND

1. Technical Field

The present invention relates to a wire harness which includes one or a plurality of high voltage conduction paths.

2. Background Art

Various devices are loaded in a vehicle. The devices are provided with a lot of electrical components or electronic components. The devices are connected with one another by wire harnesses. It is known that the wire harness is provided with a noise filter as an EMC (Electro-Magnetic Compatibility) measure. A wire harness provided with a noise filter is disclosed in JP-A-2011-61610.

A related noise filter disclosed in JP-A-2011-61610 is provided at a part of the wire harness which is wired in a vehicle so that noise can be absorbed. In particular, a cylindrical member is provided outside a magnetic body, and by winding thin wires of the wire harness around the cylindrical member, noise can be absorbed.

The thin wires are extracted from a predetermined position of the wire harness. Because the thin wires are easy to be handled, the noise filter becomes relatively easy to be formed.

The traditional noise filter is provided with a fixing clamp. The clamp protrudes from a predetermined position of the cylindrical member. Two ends of the cylindrical member are provided with wire fixing members for fixing the wires.

In a hybrid vehicle or an electric vehicle, for example, because a wire harness which connects a motor unit with an inverter unit is a high voltage one, to construct the high voltage wire harness, a plurality of thick wires are provided.

However, it is difficult to adopt the traditional noise filter when thick wires are used. The reason is that it is difficult to wind the thick wires around a small-diameter cylindrical member to a predetermined shape. In addition, in view of the wiring space between the motor unit and the inverter unit, a larger space must be secured when the thick wires are used, and this is difficult.

SUMMARY

The present invention is made in view of the above situations, and the object of the present invention is to provide a high voltage wire harness for which noise can be absorbed and it is not necessary to secure a large space.

To solve the above problem, there is provided a wire harness of the invention, comprising:
one or a plurality of high voltage conduction paths, each having a high voltage conduction path main body; and
a terminal which is provided at an end of the high voltage conduction path main body,
wherein the high voltage conduction path main body is formed into a cylindrical shape by spirally winding a metal wire rod and an insulating wire rod, and side end surfaces, which face each other, of the metal wire rod and the insulating wire rod positioned to be adjacent to each other alternately, contact each other.

According to the present invention having the above features, the high voltage conduction path main body of the high voltage conduction path not only functions as a high voltage conduction path, but also functions as an inductor. Because the present invention is not the construction in which the high voltage conduction path main body is extracted and the extracted part is formed with the noise filter, the wire harness can be made to have the required minimum thickness. In the present invention, the inductance value can be adjusted by adjusting the size of the wound wire member including the metal wire rod and the insulating wire rod and by adjusting the diameter of the wound wire member.

Also, in the wire harness of the invention, the high voltage conduction path includes a linear ferrite member, and the ferrite member is inserted into a hollow part of the high voltage conduction path main body.

According to the present invention having the above features, because the ferrite member is inserted into the high voltage conduction path main body functioning as an inductor, the inductance value can be increased.

Also, in the wire harness of the invention, the high voltage conduction path main body and the ferrite member have flexibility.

According to the present invention having the above features, because the high voltage conduction path main body and the ferrite member are flexible, the wire harness itself can be bended and wired along a desired route.

Also, in the wire harness of the invention, the high voltage conduction path includes an insulator coated on an outer surface of the high voltage conduction path main body, and an exterior member which is provided outside the insulator.

According to the present invention having the above features, because the exterior member is provided, the wire harness can be protected.

Also, in the wire harness of the invention, the terminal includes an inner terminal, which is located at an inner side of the high voltage conduction path main body and contacts an inner surface of the metal wire rod, an outer terminal, which is located at an outer side of the high voltage conduction path main body and contacts an outer surface of the metal wire rod, and an electrical contact part for external connection which is provided integrally with any of the inner terminal and the outer terminal.

According to the present invention having the above features, by adopting the terminal having the inner terminal and the outer terminal, even if the high voltage conduction path main body functions as an inductor, the end of the high voltage conduction path can be provided with the terminal for external connection.

According to the present invention, an effect is achieved which is that a high voltage wire harness, for which noise can be absorbed, and it is not necessary to secure a large space, can be provided.

In addition, according to the present invention, an effect is achieved which is that the inductance value can be increased.

According to the present invention, the following effect besides the above effects is also achieved. In other words, an effect is achieved which is that the wire harness itself can be bended and wired along a desired route.

According to the present invention, the following effect besides the above effects is also achieved. In other words, an effect is achieved which is that the wire harness can be provided with a protecting part.

According to the present invention, the following effect besides the above effects is also achieved. In other words, an effect is achieved which is that a better structure can be provided to the terminal which is connected to the end of the high voltage conduction path main body.

BRIEF DESCRIPTION OF THE DRAWINGS

FIG. 1B is a construction figure of a high voltage conduction path of FIG. 1A (embodiment 1).

FIGS. 2A and 2B are illustrative figures of configurations associated with terminal connection, in which FIG. 2A shows a construction in which an inner terminal is formed with an electrical contact part, and FIG. 2B shows a construction in which an outer terminal is formed with an electrical contact part.

FIGS. 3A and 3B are figures of another wire harness example according to the present invention in which FIG. 3A is a schematic view which shows that the wire harnesses are wired, and FIG. 3B is a construction figure of a wire harness (embodiment 2).

DETAILED DESCRIPTION OF THE EXEMPLARY EMBODIMENTS

The wire harness is a high voltage one, and the high voltage conduction path of the wire harness itself functions as a noise filter. In the wire harness, a noise filter function is added to the high voltage conduction path.

Embodiment 1

Figure 1A:
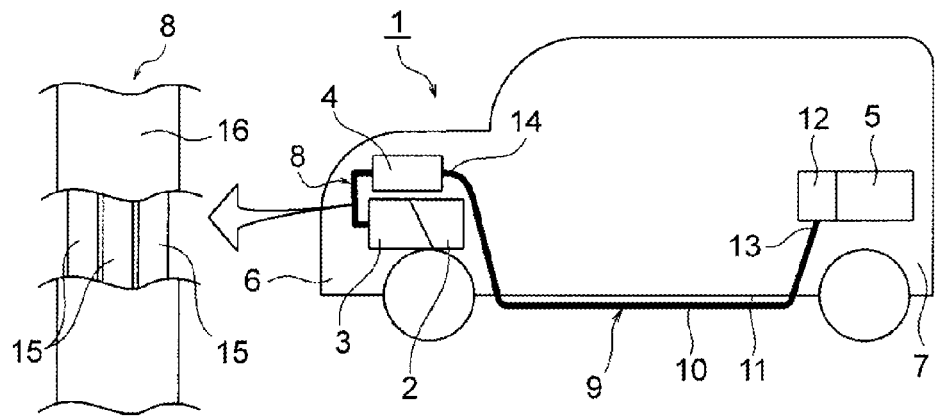
FIGS. 1A and 1B are figures of the wire harness according to the present invention, in which FIG. 1A includes a schematic view which shows that wire harnesses are wired, and a construction figure of a wire harness.
Figure 1B:
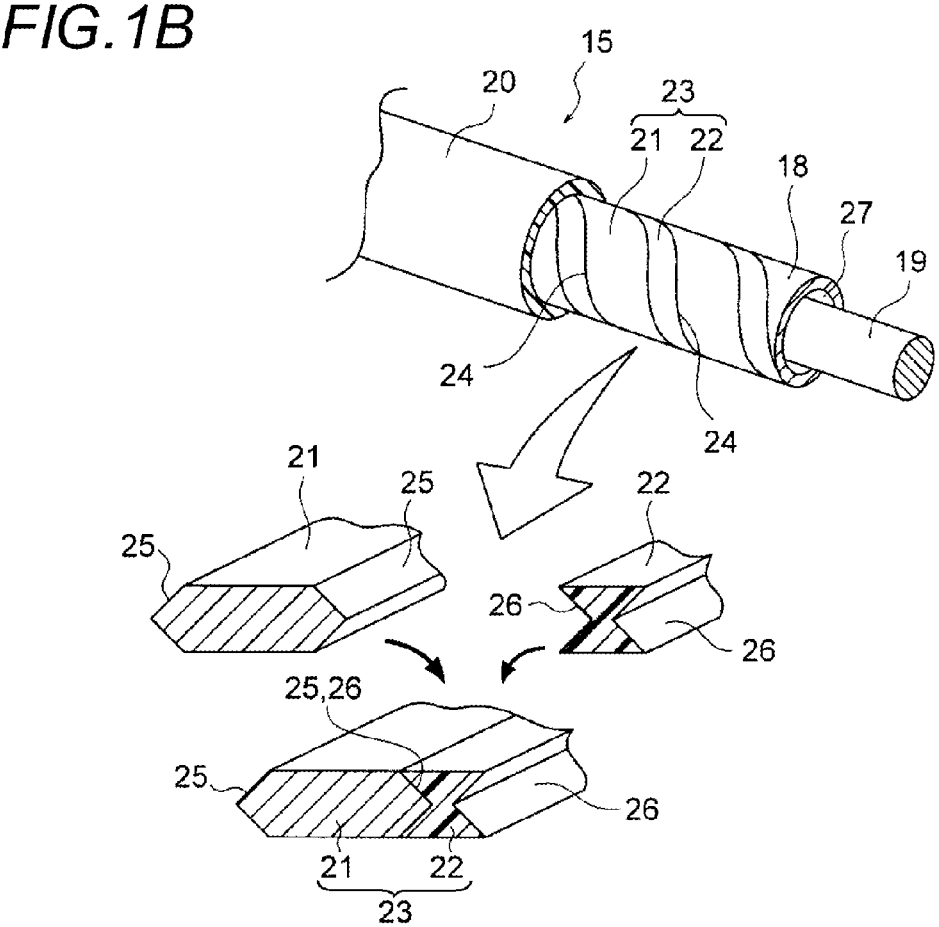

Next, an embodiment 1 is described with reference to the figures. FIGS. 1A and 1B are figures of the wire harness according to the present invention, in which FIG. 1A includes a schematic view which shows that wire harnesses are wired, and a construction figure of a wire harness, and FIG. 1B is a construction figure of a high voltage conduction path of FIG. 1A. FIGS. 2A and 2B are illustrative figures of configurations associated with terminal connection, in which FIG. 2A shows a construction in which an inner terminal is formed with an electrical contact part, and FIG. 2B shows a construction in which an outer terminal is formed with an electrical contact part.

In the embodiment, an example in which a wire harness of the present invention is applied to a hybrid vehicle (it may be an electric vehicle) is given and described.

In FIG. 1A, a reference number 1 indicates a hybrid vehicle. The hybrid vehicle 1 is a vehicle which is driven by mixing two powers of an engine 2 and a motor unit 3. The electric power from a battery 5 (battery pack) is supplied to the motor unit 3 via an inverter unit 4. The engine 2, the motor unit 3 and the inverter unit 4 are carried in an engine room 6 at the position of the front wheels and the like in the embodiment. The battery 5 is carried in a vehicle rear part 7 of the back wheels and the like. It is also possible that the battery 5 is carried in a vehicle indoor room which is behind the engine room 6.

The motor unit 3 and the inverter unit 4 are connected by a wire harness 8 of the present invention (to be described in detail below). The wire harness 8 is constructed as a high voltage wire harness. The battery 5 and the inverter unit 4 are connected by a high voltage wire harness 9. A middle part 10 of the wire harness 9 is wired at the ground side of a vehicle body floor 11. The middle part 10 is wired along the vehicle body floor 11. The vehicle body floor 11 is a well-known body and is a so-called panel member, and is formed with through holes (whose reference numbers are omitted.) at predetermined positions. The wire harness 9 is inserted through the through holes.

The wire harness 9 and the battery 5 are connected through a junction block 12 which the battery 5 is provided with. A rear end 13 of the wire harness 9 is connected to the junction block 12 with a connector. The side of the wire harness 9 at the rear end 13 is wired above the floor at the indoor side of the vehicle. The side of the wire harness 9 at a front end 14 is connected to the inverter unit 4 with a connector.

The present embodiment is further described as follows. The motor unit 3 accommodates a motor and a generator. From the junction block 12 which the battery (battery pack) 5 at the rear side of the vehicle is provided with, and through the wire harness 9 according to the present invention and the inverter unit 4 at the front side of the vehicle, electric power is supplied to the motor in the motor unit 3. In addition, the inverter unit 4 accommodates an inverter which converts direct current into alternate current and a converter which converts alternate current into direct current. The motor unit 3 is formed as a motor assembly including a shielding case. The inverter unit 4 is also formed as an inverter assembly including a shielding case. The battery 5 is a Ni-MH battery or Li-ion battery, and is modulated. Further, for example, an electric power storage device such as a capacitor may be used. The battery 5 shall not be particularly limited as long as the battery 5 may be used for the hybrid vehicle 1 or an electric vehicle.

First, the composition and the structure of the wire harness 8 of the present invention are described.

The wire harness 8 includes three high voltage conduction paths 15, an exterior member 16 which collectively covers the three high voltage conduction paths 15, and terminals 17 (refer to FIG. 2A) which are provided at ends of the high voltage conduction paths 15. In the wire harness 8, the high voltage conduction path 15 itself functions as a noise filter, as described in detail below.

The high voltage conduction path 15 includes a cylindrical high voltage conduction path main body 18 which has conductivity and which functions as an inductor, a ferrite member 19 which is inserted into the high voltage conduction path main body 18, and an insulator 20 which coats the outer side of the high voltage conduction path main body 18.

The high voltage conduction path 15 is formed to have such a length that the motor unit 3 and the inverter unit 4 can be electrically connected. Because the high voltage conduction path 15 is formed by spirally winding a metal wire rod 21 and an insulating wire rod 22 to be described below, the high voltage conduction path 15 is formed to have such a flexibility that at least wiring will not be hindered.

The high voltage conduction path main body 18 is formed into a cylindrical shape by spirally winding the metal wire rod 21 and the insulating wire rod 22 with a predetermined diameter, and in a wound wire member 23 formed by the winding operation, side end surfaces, which face each other, of the metal wire rod 21 and the insulating wire rod 22, which are positioned be adjacent to each other alternately, contact each other. A reference sign 24 shows a contact portion where the adjacent side end surfaces contact. The contact portion 24 is in such a state that the above side end surfaces are not fixed. Before the wound wire member 23 is spirally wound, the metal wire rod 21 and the insulating wire rod 22 are formed into linear shapes (the thickness is arbitrary), respectively.

The wound wire member 23 is formed in such a way that the metal wire rod 21 and the insulating wire rod 22 are different from each other in shape. In particular, the metal wire rod 21 is formed to be wider than the insulating wire rod 22. The metal wire rod 21, as shown in FIG. 1B, has two side parts 25 which are located at two sides of the metal wire rod 21 and are formed into triangular convex parts toward the adjacent insulating wire rods 22 respectively. Two side parts 26 of the insulating wire rod 22 are formed into triangular concave parts which are recessed toward the center of the insulating wire rod 22 (the convex and concave shape is an example). The triangular convex and concave parts are formed with such a dimensional relation that they can properly fitted.

The high voltage conduction path main body 18 is formed by alternately arranging and spirally winding the metal wire rod 21 and the insulating wire rod 22 which are different form each other in shape. The high voltage conduction path main body 18 has a spring effect because the metal wire rod 21 and the insulating wire rod 22 are spirally wound, and accordingly, the high voltage conduction path main body 18 has flexibility.

For example, aluminum or aluminum alloy is exemplified as the material of the metal wire rod 21. In addition, copper, copper alloy, iron or the like also can be exemplified. The material is not particularly limited. On the other hand, the material of the insulating wire rod 22 is not particularly limited to resin material that has insulating property. Olefin resin material is exemplified as an example. Polyethylene or the like is also suitable.

Because the metal wire rod 21 and the insulating wire rod 22 are spirally wound with a predetermined diameter, the high voltage conduction path main body 18 is formed with a hollow part 27 inside the wound wire member 23. The ferrite member 19 is inserted into the hollow part 27.

In the embodiment, the ferrite member 19 is inserted after the high voltage conduction path main body 18 is formed, but the present invention is not limited to this. In other words, it is also possible that the wound wire member 23 is spirally wound with a predetermined diameter around the ferrite member 19 to form the high voltage conduction path main body 18, and thereby the ferrite 19 is inserted.

The ferrite member 19 is included to increase the inductance value. The total length of the ferrite member 19 is set to accommodate the length of the high voltage conduction path main body 18. The ferrite member 19 in the embodiment is slender with a cross section of a round shape, and is formed to have flexibility. In order to have flexibility, a method of putting ferrite powder into rubber or the like to be molded, or a method of putting metal powder into resin material to be molded, is adopted.

The ferrite member 19 is not limited to the above description as long as the ferrite member 19 has sufficient flexibility when the wire harness 8 is used.

The insulator 20 is formed by extrusion molding a well-known resin material having insulating property to the outer surface of the high voltage conduction path main body 18. The insulator 20 is formed with a predetermined thickness.

The exterior member 16 is a member which collectively covers the above three high voltage conduction paths 15, and in the present embodiment is so formed that a sheet-like member, which will not undermine the flexibility of the high voltage conduction paths 15, is wound and can be maintained in the wound state by a tape or the like. The exterior member 16 is not particularly limited as long as the high voltage conduction paths 15 can be protected.

In FIGS. 2A and 2B, the terminal 17 is an electrical connection member which is provided at an end of the high voltage conduction path main body 18, and which is formed by forging a metal plate which has conductivity. Because the terminal 17 is provided at the end of the high voltage conduction path main body 18 which has the hollow part 27, the terminal 17 is formed of two components. Two kinds of terminals 17 (17') are illustrated to describe the two components below.

In FIG. 2A, the above two components are constructed from an inner terminal 28 and an outer terminal 29. The inner terminal 28 is provided with a cylindrical receiving part 30 which is inserted into the hollow part 27, and an electrical contact part 31 which is connected to a connection mating part which is not shown in the figure. The electrical contact part 31 is provided integrally with the cylindrical receiving part 30. The outer terminal 29 is formed into such a shape that the outer terminal 29 is fastened to the end outside of the high voltage conduction path main body 18. When the cylindrical receiving part 30 of the inner terminal 28 is inserted into the hollow part 27, the cylindrical receiving part 30 is electrically connected to the inner surface of the metal wire rod 21 of the high voltage conduction path main body 18. When the outer terminal 29 is fastened to the end outside of the high voltage conduction path main body 18, the inner terminal 28 and the outer terminal 29 contact the metal wire rod 21 by sandwiching the high voltage conduction path main body 18 from the inside and the outside.

In FIG. 2B, the above two components are constructed from an inner terminal 32 and an outer terminal 33. The inner terminal 32 is formed as a receiving part of a cylindrical shape which is inserted into the hollow part 27. The outer terminal 33 is formed with an electrical contact part 34 connected to a connection mating part (not shown in the figure), and a crimping part 35 which is fastened to the end outside of the high voltage conduction path main body 18. The electrical contact part 34 is provided integrally with the crimping part 35. The crimping part 35 of the outer terminal 33 is fastened and electrically connected to the outer surface of the metal wire rod 21 of the high voltage conduction path main body 18. When the outer terminal 29 is fastened to the end outside of the high voltage conduction path main body 18, the inner terminal 32 and the outer terminal 33 contact the metal wire rod 21 by sandwiching the high voltage conduction path main body 18 from the inside and the outside.

As described with reference to FIGS. 1A to 2B, according to the wire harness 8 of the present invention, because the high voltage conduction path main body 18 of the high voltage conduction path 15 not only functions as a high voltage conduction path, but also functions as an inductor, the high voltage conduction path main body 18 itself can be made to function as a noise filter. Because the wire harness 8 does not have the traditional construction in which wires are extracted, and the extracted part is formed with a noise filter, the wire harness 8 can be formed to have a required minimum thickness.

Thus, according to the present invention, an effect is achieved which is that a high voltage wire harness 8, for which noise can be absorbed, and it is not necessary to secure a large space, can be provided.

In addition, according to the wire harness 8 of the present invention, an effect is achieved which is that by adjusting the size of the wound wire member 23 including the metal wire rod 21 and the insulating wire rod 22 and by adjusting the diameter of the wound wire member 23, the inductance value can be adjusted.

According to the wire harness 8 of the present invention, because the ferrite member 19 is inserted into the hollow part 27 of the high voltage conduction path main body 18, an effect is achieved which is that the inductance value can be increased.

Furthermore, according to the wire harness 8 of the present invention, because the high voltage conduction path main body 18 and the ferrite member 19 have flexibility, an effect is achieved which is that the wire harness 8 itself can be bended and wired along a desired route.

Embodiment 2

Figure 3A:
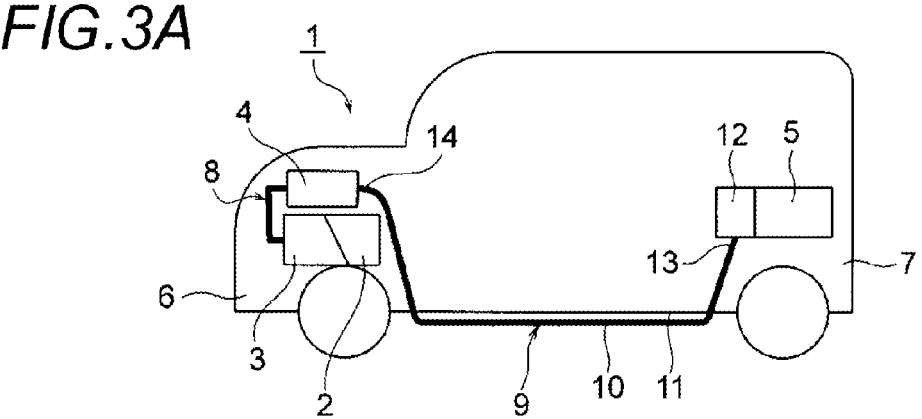
Figure 3B:
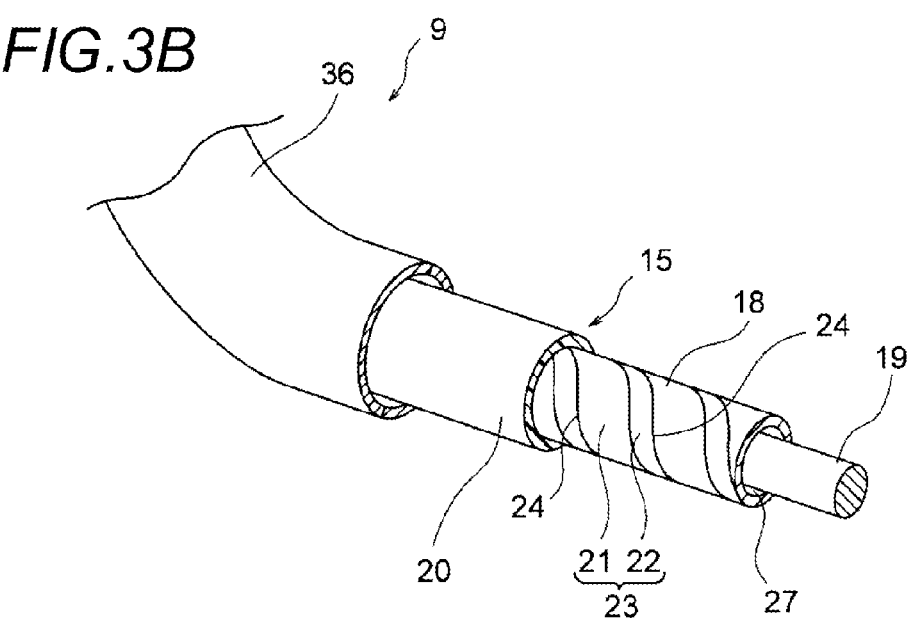

Next, an embodiment 2 is described with reference to the figures. FIGS. 3A and 3B are figures of another wire harness example according to the present invention, in which FIG. 3A is a schematic view which shows that the wire harnesses are wired, and FIG. 3B is a construction figure of a wire harness. Furthermore, the components that are identical with those in the above-mentioned embodiment 1 are given identical numbers, and their detailed description is omitted.

In FIG. 3A, the wire harness 9 connects the battery 5 with the inverter unit 4, and the middle part 10 is wired under the vehicle body floor 11. The wire harness 9, like the wire harness 8 in the embodiment 1, also functions as a noise filter.

First, the composition and the structure of the wire harness 9 of the present invention are described.

Two wire harnesses 9 are wired side by side (only one is shown in the figure). The wire harness 9 includes a high voltage conduction path 15, an exterior member 36 which covers the high voltage conduction path 15, and a terminal 17 (refer to FIGS. 2A and 2B) which is provided at an end of the high voltage conduction path 15.

The high voltage conduction path 15, like that of the embodiment 1, includes a high voltage conduction path main body 18 which has conductivity and functions as an inductor, a ferrite member 19 which is inserted into the high voltage conduction path main body 18, and an insulator 20 which coats the outside of the high voltage conduction path main body 18.

The exterior member 36 is a member which protects the high voltage conduction path 15, and in particular, may be a corrugated tube, a metal pipe, a protector or the like as examples.

Needless to say, the wire harness 9 of the embodiment 2 plays the same effects as those of the wire harness 8 of the embodiment 1.

It is apparent that various modifications can be made to the invention without changing the purpose of the invention.

The features of the embodiments of the wire harnesses according to the present invention described above are briefly, collectively listed in the following (i) to (v), respectively.

[i] A wire harness (8) comprising:
one or a plurality of high voltage conduction paths (15), each having a high voltage conduction path main body (18); and
a terminal (17) which is provided at an end of the high voltage conduction path main body (18),
wherein the high voltage conduction path main body (18) is formed into a cylindrical shape by spirally winding a metal wire rod (21) and an insulating wire rod (22), and side end surfaces, which face each other, of one part of the metal wire rod (21) and the insulating wire rod (22) positioned to be adjacent to each other alternately, contact each other.

[ii] The wire harness (8) according to item [i], wherein the high voltage conduction path (15) includes a linear ferrite member (19); and wherein the ferrite member (19) is inserted into a hollow part (27) of the high voltage conduction path main body (18).

[iii] The wire harness (8) according to item [ii], wherein the high voltage conduction path main body (18) and the ferrite member (19) have flexibility.

[iv] The wire harness (8) according to any one of items [i] to [iii], wherein the high voltage conduction path (15) includes an insulator (20) coated on the periphery of the high voltage conduction path main body (18), and an exterior member (16) which is provided outside the insulator (20).

[v] The wire harness (8) according to any one of items [i] to [iv], wherein the terminal (17) includes an inner terminal (28, 32) which is located at an inner side of the high voltage conduction path main body (18) and contacts an inner surface of the metal wire rod (21), an outer terminal (29, 33) which is located at an outer side of the high voltage conduction path main body (18) and contacts an outer surface of the metal wire rod (21), and an electrical contact part (34) for external connection which is provided integrally with any of the inner terminal (28, 32) and the outer terminal (29, 33).

Although the invention is described in detail with reference to specific embodiments, it is apparent that various modifications and amendments may be made by those skilled in the art without departing from the spirit and scope of the invention.

The present invention is useful in the wire harness which includes one or a plurality of high voltage conduction paths.

What is claimed is:

1. A wire harness comprising:
one or a plurality of conduction paths, each having a conduction path main body; and
a terminal which is provided at an end of the conduction path main body,
wherein the conduction path main body is formed into a cylindrical shape by spirally winding a metal wire rod and an insulating non-conductive rod, and side end surfaces, which face each other, of the metal wire rod and the insulating non-conductive rod positioned to be adjacent to each other alternately, contact each other.

2. The wire harness according to claim 1, wherein the conduction path includes a linear ferrite member; and
wherein the ferrite member is inserted into a hollow part of the conduction path main body.

3. The wire harness according to claim 2, wherein the conduction path main body and the ferrite member have flexibility.

4. The wire harness according to claim 1, wherein the conduction path includes an insulator coated on an outer surface of the conduction path main body, and an exterior member which is provided outside the insulator.

5. A wire harness comprising:
one or a plurality of conduction paths, each having a conduction path main body; and
a terminal which is provided at an end of the conduction path main body,
wherein the conduction path main body is formed into a cylindrical shape by spirally winding a metal wire rod and an insulating wire rod, and side end surfaces, which face each other, of the metal wire rod and the insulating wire rod positioned to be adjacent to each other alternately, contact each other,
wherein the terminal includes:
an inner terminal, which is located at an inner side of the conduction path main body and contacts an inner surface of the metal wire rod;
an outer terminal, which is located at an outer side of the conduction path main body and contacts an outer surface of the metal wire rod; and an electrical contact part for external connection which is provided integrally with any of the inner terminal and the outer terminal.

6. The wire harness according to claim 1, the metal wire rod and the insulating non-conductive rod have different cross sectional shapes.

7. The wire harness according to claim 1, the metal wire rod has a triangular convex portion configured to fit with a triangular concave portion of the insulating non-conductive rod.

* * * * *